United States Patent
Miyamoto et al.

(10) Patent No.: US 12,430,816 B2
(45) Date of Patent: Sep. 30, 2025

(54) COLOR REPLACEMENT FOR THE COLORBLIND USING AN AUTOMATIC IMAGE COLORIZATION ARTIFICIAL INTELLIGENCE MODEL

(71) Applicant: INTERNATIONAL BUSINESS MACHINES CORPORATION, Armonk, NY (US)

(72) Inventors: Taihei Miyamoto, Nakano (JP); Kaoru Ohashi, Sumida-ku (JP); Akira Fujiu, Mitaka (JP); Kazuki Sekiguchi, Adachi-ku (JP)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 17/807,644

(22) Filed: Jun. 17, 2022

(65) Prior Publication Data

US 2023/0410387 A1 Dec. 21, 2023

(51) Int. Cl.
*G06T 11/00* (2006.01)
*G06T 7/90* (2017.01)

(52) U.S. Cl.
CPC .............. *G06T 11/001* (2013.01); *G06T 7/90* (2017.01); *G06T 2207/10024* (2013.01); *G06T 2207/20081* (2013.01)

(58) Field of Classification Search
None
See application file for complete search history.

(56) References Cited

U.S. PATENT DOCUMENTS

| 10,997,752 B1* | 5/2021 | Yoo ........................ G06T 11/00 |
| 2005/0105796 A1* | 5/2005 | Hong ...................... H04N 9/73 |
| | | 345/581 |

(Continued)

FOREIGN PATENT DOCUMENTS

| JP | 2019117558 A | * | 7/2019 |
| JP | 2019125912 A | | 7/2019 |
| JP | 2021109341 A | | 8/2021 |

OTHER PUBLICATIONS

Zhang et al. "Real-time user-guided image colorization with learned deep priors." arXiv preprint arXiv:1705.02999 (2017) (Year: 2017).*

(Continued)

*Primary Examiner* — Saptarshi Mazumder
(74) *Attorney, Agent, or Firm* — Jordan T. Schiller

(57) ABSTRACT

A computer-implemented method for selectively replacing a color of an object in an original image due to color blindness of a viewer. The method includes identifying whether there are color groups that are hard to be distinguished at a border between one or more objects in an original image. The method further includes generating a grayscale image from the original image and estimating an original color of each pixel in the original image by inputting the generated grayscale image to an automatic colorization artificial intelligence (AI) model. The method further includes determining at least one color group for which color replacement is to be performed and replacing the determined at least one color group with a color that is easily perceived by the person having a color vision deficiency and that is easily distinguished from the other color groups at the border between the identified one or more objects.

20 Claims, 5 Drawing Sheets

(56) References Cited

U.S. PATENT DOCUMENTS

| | | |
|---|---|---|
| 2013/0201496 A1 | 8/2013 | Boggs |
| 2019/0172229 A1 | 6/2019 | Chan |
| 2019/0279402 A1 | 9/2019 | Panetta |

OTHER PUBLICATIONS

Aisch, "I wrote some code that automatically checks visualizations for non-colorblind safe colors. Here's how it works", vis4.net [blog], Feb. 8, 2018 [accessed on Feb. 7, 2022], 8 pages, Retrieved from the Internet: <URL: https://vis4.net/blog/2018/02/automate-colorblind-checking/>.

Chen, et al., "Semantic Image Segmentation with DeepLab in TensorFlow," Google AI Blog [online], Mar. 12, 2018 [accessed on Feb. 7, 2022], 3 pages, Retrieved from the Internet: <URL: https://ai.googleblog.com/2018/03/semantic-image-segmentation-with.html>.

Chromatic Glass, datasheet [online], Asada, [accessed on Feb. 7, 2022], 2 pages, Retrieved from the Internet: <URL: https://asada.website/chromaticglass/e/index.html>.

Huang, et al., "Image recolorization for the colorblind," 2009 IEEE International Conference on Acoustics, Speech and Signal Processing, Apr. 19-24, 2009, pp. 1161-1164, IEEE, Taipei, TW, DOI: 10.1109/ICASSP.2009.4959795, Retrieved from the Internet: <URL: https://ieeexplore.ieee.org/document/4959795>.

Iizuka, e tal., "Joint End-to-end Learning of Global and Local Image Priors for Automatic Image Colorization with Simultaneous Classification," SIGGRAPH 2016, [accessed on Feb. 7, 2022], 5 pages, Retrieved from the Internet: <URL: http://iizuka.cs.tsukuba.ac.jp/projects/colorization/en/>.

Khodadadeh, et al., "Automatic Object Recoloring Using Adversarial Learning," 2021 IEEE Winter Conference on Applications of Computer Vision (WACV), Jan. 3-8, 2021 [accessed on Feb. 7, 2022], pp. 1487-1495, IEEE, Waikoloa, HI, USA, DOI: 10.1109/WACV48630.2021.00153, Retrieved from the Internet: <URL: https://ieeexplore.ieee.org/document/9423162>.

Mell, et al., "The NIST Definition of Cloud Computing", National Institute of Standards and Technology, Special Publication 800-145, Sep. 2011, 7 pages.

\* cited by examiner

COLOR REPLACEMENT FOR THE COLORBLIND USING AN AUTOMATIC IMAGE COLORIZATION ARTIFICIAL INTELLIGENCE MODEL

BACKGROUND

The present invention relates generally to the field of artificial intelligence (AI), and more particularly to image analytics.

There is known color vision variation by which people see different colors when viewing the same image. About one out of twenty men has color blindness and about one out of five-hundred women has color blindness. Oftentimes, color blindness makes it difficult for people to recognize color coding used for product user interfaces (UIs), presentation slides or the like, and for equally presenting a color arrangement to all people. As such, a barrier-free color arrangement is needed.

BRIEF SUMMARY

Embodiments of the present invention disclose a method, a computer program product, and a system.

According to an embodiment of the present invention, a method for selectively replacing a color of an object that gives no strangeness feeling to a person having a color vision deficiency even when color replacement is performed, is presented. The method includes identifying whether there are color groups that are hard to be distinguished, by a person having a color vision deficiency, at a border between one or more objects in an original image. The method further includes generating a grayscale image from the original image, in response to the identification of color groups that are hard to be distinguished and estimating an original color of each pixel in the original image by inputting the generated grayscale image to an automatic colorization artificial intelligence (AI) model, wherein the automatic colorization AI model estimates the original color of the one or more objects in the grayscale image. The method further includes determining at least one color group for which color replacement is to be performed, from the color groups that are hard to be distinguished, wherein the at least one color group for which the color replacement is to be performed is a color group for which a confidence level of the estimated original color output by the AI model is low. The method further includes replacing the determined at least one color group with a color that is easily perceived by the person having a color vision deficiency and that is easily distinguished from the other color groups at the border between the identified one or more objects.

According to a further embodiment of the invention, a computer program product for selectively replacing a color of an object includes program code embodied on a non-transitory tangible storage device. The program code is executable by a processor of a computer to perform a method. The method includes identifying whether there are color groups that are hard to be distinguished, by a person having a color vision deficiency, at a border between one or more objects in an original image. The method further includes generating a grayscale image from the original image, in response to the identification of color groups that are hard to be distinguished and estimating an original color of each pixel in the original image by inputting the generated grayscale image to an automatic colorization artificial intelligence (AI) model, wherein the automatic colorization AI model estimates the original color of the one or more objects in the grayscale image. The method further includes determining at least one color group for which color replacement is to be performed, from the color groups that are hard to be distinguished, wherein the at least one color group for which the color replacement is to be performed is a color group for which a confidence level of the estimated original color output by the AI model is low. The method further includes replacing the determined at least one color group with a color that is easily perceived by the person having a color vision deficiency and that is easily distinguished from the other color groups at the border between the identified one or more objects.

According to a further embodiment of the invention, a computer system for selectively replacing a color of an object includes one or more computer devices each having one or more processors and one or more tangible storage devices. The system further includes a program embodied on at least one of the one or more storage devices. The program includes a set of program instructions for execution by the one or more processors. The program instructions cause the one or more processors to execute a method. The method includes identifying whether there are color groups that are hard to be distinguished, by a person having a color vision deficiency, at a border between one or more objects in an original image. The method further includes generating a grayscale image from the original image, in response to the identification of color groups that are hard to be distinguished and estimating an original color of each pixel in the original image by inputting the generated grayscale image to an automatic colorization artificial intelligence (AI) model, wherein the automatic colorization AI model estimates the original color of the one or more objects in the grayscale image. The method further includes determining at least one color group for which color replacement is to be performed, from the color groups that are hard to be distinguished, wherein the at least one color group for which the color replacement is to be performed is a color group for which a confidence level of the estimated original color output by the AI model is low. The method further includes replacing the determined at least one color group with a color that is easily perceived by the person having a color vision deficiency and that is easily distinguished from the other color groups at the border between the identified one or more objects.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
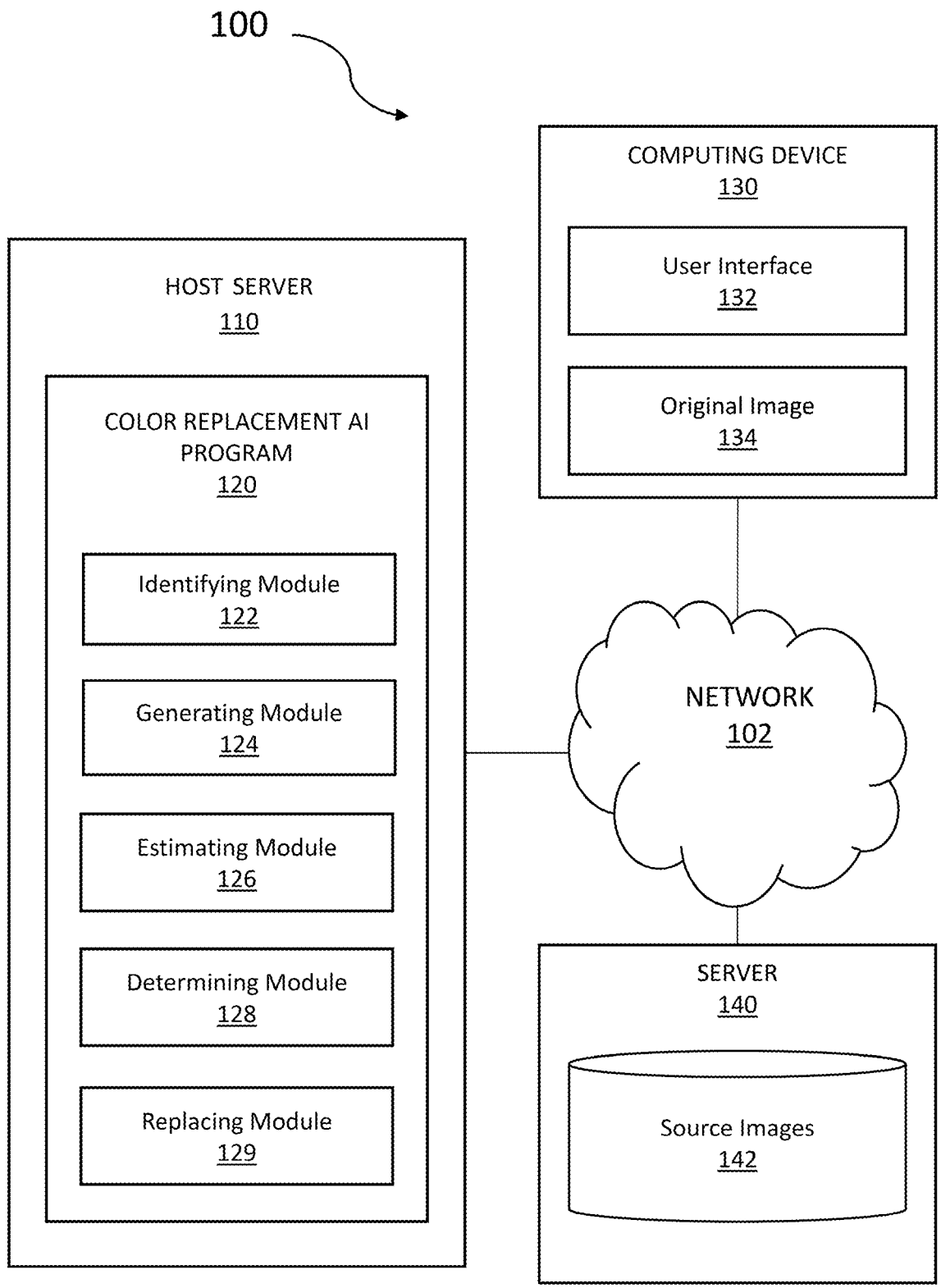
FIG. 1 is a block diagram illustrating a color replacement environment, in accordance with an embodiment of the present invention.

The present disclosure discloses a method for selectively replacing a color of an object in an original image that gives no strangeness feeling to a person having a color vision deficiency, even when color replacement is performed.

Research has shown that color vision varies with people. About one out of twenty (20) men, and about one out of five hundred (500) women, have color blindness. For people with color blindness, it is oftentimes difficult to recognize color coding used for product user interfaces (UIs), slide presentations or the like, and for equally presenting the color arrangement to all viewers. As such, a barrier-free color arrangement is needed.

In a case where two adjacent objects in an image have similar colors and are hardly distinguishable, the color of one object may be replaced with another color to help distinguish the multiple objects within an image. However, if the replacement of the original color is merely decided by distinguishability, then the user can have a strangeness feeling when looking at the image. For example, if the yellow color of a banana is replaced with the color purple, then a viewer may find it strange, and unrealistic, to see a purple banana in the color-revised image.

In another example, color replacement of an image in which a strawberry is on a green plate. For people who can hardly distinguish the colors red and green, a distinguishable image is obtained by replacing either the red or the green with blue. When the color of the strawberry is replaced with the color blue, the viewer may have a stronger strangeness feeling than when the color of the plate is replaced with the color blue, since strawberries are typically red and a plate may be any color.

The main idea of the invention is to replace a color of an object for which color replacement does not affect the perception of the object. For example, strawberries are red but other inanimate objects, such as an umbrella, can be red or any other color. In this scenario, the confidence level of the estimated color output by the automatic image colorization AI model disclosed herein (i.e., the probability that the object has the estimated color) is lower for the umbrella (since the umbrella can be any color) and higher for the strawberries (since the strawberries are typically red).

The present disclosure details a novel method to estimate the degree of strangeness feeling due to a color alteration for each object within an image, using an automatic image colorization AI model, and preferentially performing the color replacement of an object that gives less of a strangeness feeling to the viewer with color blindness.

Hereinafter, exemplary embodiments of the present disclosure will be described in detail with reference to the attached drawings.

The present disclosure is not limited to the exemplary embodiments below but may be implemented with various modifications within the scope of the present disclosure. In addition, the drawings used herein are for purposes of illustration, and may not show actual dimensions.

FIG. 1 illustrates color replacement computing environment 100, in accordance with an embodiment of the present disclosure. Color replacement computing environment 100 includes host server 110, computing device 130, and server 140 all connected via network 102. The setup in FIG. 1 represents an example embodiment configuration for the present disclosure and is not limited to the depicted setup to derive benefit from the present disclosure.

In an exemplary embodiment, host server 110 includes color replacement AI program 120. In various embodiments, host server 110 may be a laptop computer, tablet computer, netbook computer, personal computer (PC), a desktop computer, a personal digital assistant (PDA), a smart phone, a server, or any programmable electronic device capable of communicating with computing device 130 and server 140 via network 102. Host server 110 may include internal and external hardware components, as depicted, and described in further detail below with reference to FIG. 3. In other embodiments, host server 110 may be implemented in a cloud computing environment, as described in relation to FIGS. 4 and 5, herein. Host server 110 may also have wireless connectivity capabilities allowing the host server 110 to communicate with computing device 130, server 140, and other computers or servers over network 102.

With continued reference to FIG. 1, computing device 130 includes user interface 132 and original image 134 and may be a laptop computer, tablet computer, netbook computer, personal computer (PC), a desktop computer, a personal digital assistant (PDA), a smart phone, or any programmable electronic device capable of communicating with host server 110 and server 140 via network 102. Computing device 130 may include internal and external hardware components, as depicted, and described in further detail below with reference to FIG. 3. In other embodiments, computing device 130 may be implemented in a cloud computing environment, as described in relation to FIGS. 4 and 5, herein.

In exemplary embodiments, user interface 132 is a computer program which allows a user to interact with computing device 130 and other connected devices via network 102. For example, user interface 132 may be a graphical user interface (GUI). In addition to comprising a computer program, user interface 132 may be connectively coupled to hardware components, such as those depicted in FIG. 3, for receiving user input. In an exemplary embodiment, user interface 132 may be a web browser, however in other embodiments user interface 132 may be a different program capable of receiving user interaction and communicating with other devices.

With continued reference to FIG. 1, server 140 comprises source images 142 and may be a laptop computer, tablet computer, netbook computer, personal computer (PC), a desktop computer, a personal digital assistant (PDA), a smart phone, or any programmable electronic device capable of communicating with host server 110 and computing device 130 via network 102.

In exemplary embodiments, source images 142 are a corpora of image documents, slide presentations, word processing documents, diagrams, graphs, or any other computer-related documents containing multi-color images. The automatic image colorization AI model, described herein, ingests source images 142 and continuously learns shapes and associated colors prior to color replacement AI program 120 running.

With continued reference to FIG. 1, host server 110 includes color replacement AI program 120. Host server 110 may be a laptop computer, tablet computer, netbook computer, personal computer (PC), a desktop computer, a personal digital assistant (PDA), a smart phone, or any programmable electronic device capable of communicating with computing device 130 and server 140 via network 102.

The automatic image colorization AI model utilizes AI technology to learn combinations of shapes and colors from a large amount of image data (e.g., source images 142) and colorizing a monochrome image. Given this AI technology, the accuracy for reproducing the color of a blue sky, the colors of trees in a forest, the color of snow on winter day, and other similar examples is relatively high. However, for objects for which it is difficult to estimate the color from the given shape (e.g., clothes, cars, and the like), the accuracy is relatively low. This is because there are a plurality of objects that have an identical shape but have different colors. When the automatic image colorization AI model learns shapes and corresponding colors, there is no specific relation between the shapes and colors of clothes, cars, and other similar inanimate objects.

A human's strangeness feeling due to an alteration of the color of an object in an image is stronger when there is a specific tendency in the relation between the shape and the color of the object. Therefore, a color replacement with less of a strangeness feeling can be performed by altering the color of an object that is estimated at a low confidence level (e.g., a plate) by the automatic image colorization AI model, without altering the color of an object that is estimated at a higher confidence level (e.g., a strawberry).

With continued reference to FIG. 1, color replacement AI program 120, in an exemplary embodiment, may be a computer application on host server 110 that contains instruction sets, executable by a processor. The instruction sets may be described using a set of functional modules. In exemplary embodiments, color replacement AI program 120 may receive input from computing device 130 and server 140 over network 102. In alternative embodiments, color replacement AI program 120 may be a computer application on computing device 130, or a standalone program on a separate electronic device.

With continued reference to FIG. 1, the functional modules of color replacement AI program 120 include identifying module 122, generating module 124, estimating module 126, determining module 128, and replacing module 129.

In exemplary embodiments, the delineated modules of color replacement AI program 120 provide a framework for color replacement of multi-color images for color blind people, based on previous learning of the automatic image colorization AI model.

Figure 2:
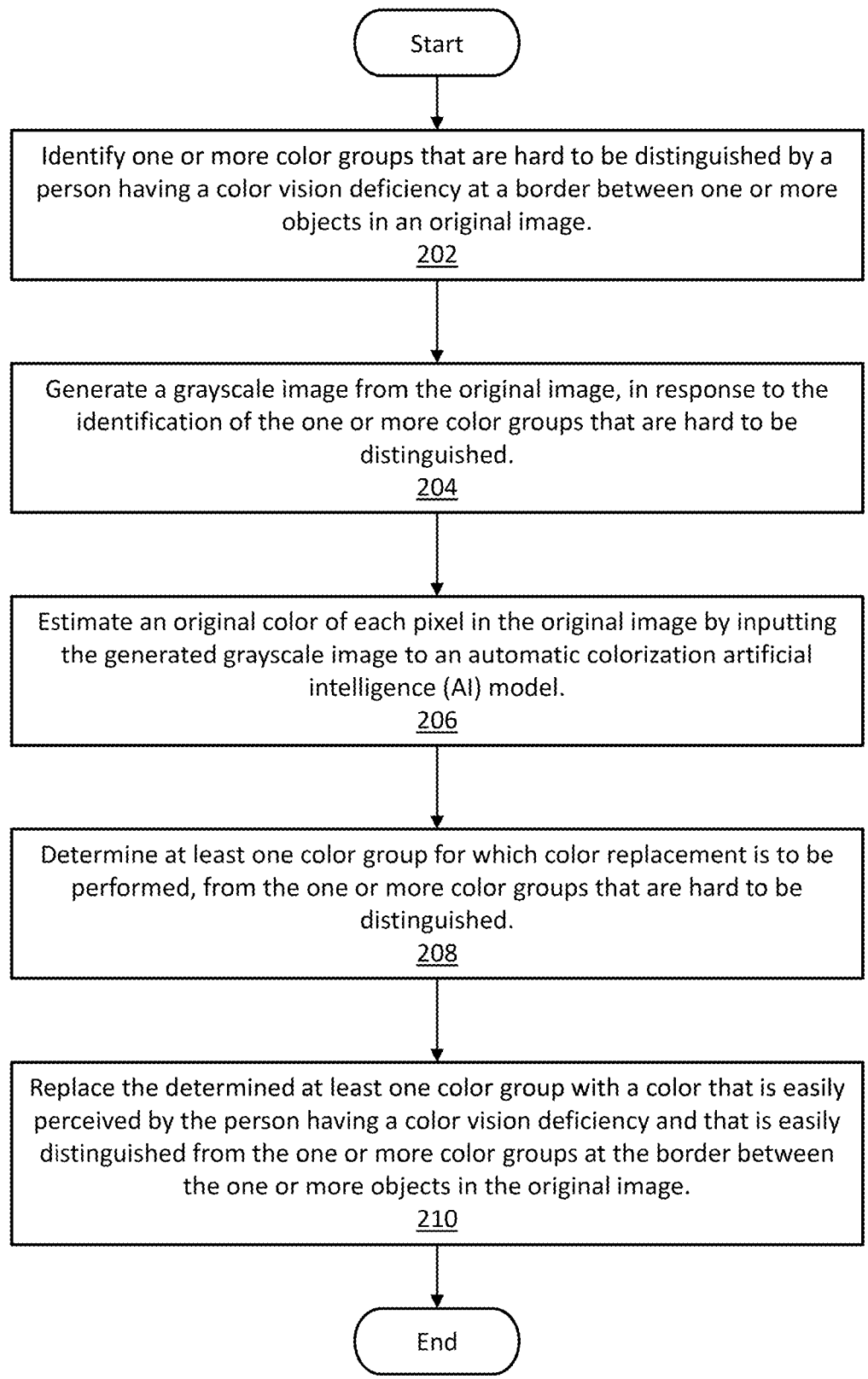
FIG. 2 is a flowchart depicting operational steps of color replacement AI program of FIG. 1, in accordance with an embodiment of the present invention.

FIG. 2 is a flowchart illustrating the operation of color replacement AI program 120 of FIG. 1, in accordance with embodiments of the present disclosure.

In exemplary embodiments, color replacement AI program 120 maps a plurality of original colors of the original image with the one or more colors that are seen by the person having the color vision deficiency. Further, color replacement AI program 120 identifies the one or more objects in the original image for which color replacement is needed, based on the mapping and groups similar colors of the plurality of original colors in the identified one or more objects in the original image.

In further exemplary embodiments, color replacement AI program 120 groups the colors into ranges that include a certain number of colors, wherein the ranges include several tens of colors to several hundreds of colors.

In exemplary embodiments, mapping a plurality of original colors of the original image with the one or more colors that are seen by the person having the color vision deficiency indicates how the color vision of a person differs depending on various color vision characteristics. An image for which the color replacement is performed is prepared by color replacement AI program 120.

In various exemplary embodiments, colors are grouped into ranges including a certain number of colors, wherein ranges can include several tens of colors to several hundreds of colors. Whether there are colors that are difficult to be distinguished at the border, between adjacent objects, is checked after the color replacement using the mapping. In embodiments where there are no colors that are hard to be distinguished, the process is completed.

With reference to FIGS. 1 and 2, identifying module 122 includes a set of programming instructions in color replacement AI program 120, to identify one or more color groups that are hard to be distinguished by a person having a color vision deficiency at a border between one or more objects in an original image (step 202). The set of programming instructions is executable by a processor.

In exemplary embodiments, identifying module 122 recognizes one or more objects in the original images by semantic segmentation. Semantic segmentation is the task of assigning a class label to every pixel in an image. Semantic segmentation follows three steps: classifying a certain object within an image; localizing the object and drawing a bounding box around it; and grouping the pixels in a localized image by creating a segmentation mask. Essentially, semantic segmentation classifies a certain class of image and separates it from the rest of the image classes by overlaying it with a segmentation mask.

With reference to an illustrative example, Joe has prepared a slide presentation for his school project. Joe inserts an original color image of a firetruck next to a green car on the street in his school slide presentation. To accommodate the variations in color visions of the various students in his class, Joe utilizes color replacement AI program 120. The program identifies, via semantic segmentation, the image of the red firetruck next to the green car. Identifying module 122 groups the colors red and green into a category of "hard to distinguish" one from the other, where the colors meet at the borders.

With continued reference to FIGS. 1 and 2, generating module 124 includes a set of programming instructions in color replacement AI program 120, to generate a grayscale image from the original image, in response to the identification of the one or more color groups that are hard to be distinguished (step 204). The set of programming instructions are executable by a processor.

In exemplary embodiments, generating module 124 generates a monochrome image from the original image.

With continued reference to the illustrative example, generating module 124 generates a monochrome grayscale image from the original image of the red firetruck and green car.

With continued reference to FIGS. 1 and 2, estimating module 126 includes a set of programming instructions in color replacement AI program 120, to estimate an original color of each pixel in the original image by inputting the generated grayscale image to an automatic colorization AI model, wherein the automatic colorization AI model estimates the original color of the one or more objects in the grayscale image (step 206). The set of programming instructions are executable by a processor.

In exemplary embodiments, estimating module 126 estimates a color for each pixel in the generated monochrome image. Estimating module 126 utilizes a formula to determine a color replacement in the image. For example, the color for replacement is decided such that the difference from the other color in the vicinity of the border is maximized.

In exemplary embodiments, color replacement AI program 120 calculates a score for each of the adjacent objects that are hard to be distinguished and, for each of the color groups, using a color with the lowest calculated score to replace the color group in the original image.

In exemplary embodiments, a score ($S_{o,c}$) is calculated for each of the adjacent objects (o) that are difficult to be distinguished and for each of the colors (c). For example, using the following formula, the color having the lowest score is preferentially replaced. The formula is as follows:

$$S_{o,c} = \frac{\sum_i^{N_c} P_{i,c}}{N_c}$$

$N_c$ is the number of pixels having the color (c) that is difficult to be distinguished and $P_{i,c}$ is the confidence level of the estimation that a pixel (i) has the color (c).

With continued reference to the illustrative example, estimating module 126 estimates a high confidence level for the color red to be associated with the firetruck, as opposed to a low confidence of yellow, white, or black for the firetruck. Further, estimating module 126 estimates a low confidence of various colors (e.g., black, blue, yellow) to be associated with the car.

With continued reference to FIGS. 1 and 2, determining module 128 includes a set of programming instructions in color replacement AI program 120, to determine at least one color group for which color replacement is to be performed, from the one or more color groups that are hard to be distinguished, wherein the at least one color group for which the color replacement is to be performed is a color group for which a confidence level of the estimated original color by the automatic colorization AI model is low (step 208). The set of programming instructions are executable by a processor.

In exemplary embodiments, the automatic image colorization AI model is a technology of learning one or more combinations of shapes and colors from a large amount of image data and colorizing a monochrome image.

With continued reference to the illustrative example, determining module 126 determines that a blue car, as a color replacement for the color green, is more easily distinguishable from the adjacent red firetruck in the image. Determining module 126 determines that the green car has the lowest confidence score, of all objects in the original image. The lowest confidence score indicates that the green car may be changed to an alternate color without creating a strangeness feeling to a viewer (since a car may be any color), and at the same time making the objects more distinguishable from each other in the original image.

With continued reference to FIGS. 1 and 2, replacing module 129 includes a set of programming instructions in color replacement AI program 120, to replace the determined at least one color group with a color that is easily perceived by the person having a color vision deficiency and that is easily distinguished from the one or more color groups at the border between the one or more objects in the original image (step 210). The set of programming instructions are executable by a processor.

In exemplary embodiments, replacing module 129 replaces the determined at least one color group with a color that does not affect a perception of the one or more objects in the image.

In exemplary embodiments, color replacement AI program 120 estimates a degree of strangeness feeling perceived by a viewer, based on the replaced at least one color group of the identified one or more objects in the original image, and wherein the one or more objects that gives a strong strange feeling to the viewer, due to the replaced at least one color group, has a high confidence level in colorization by the automatic colorization AI model and is colorized with the same color as that in the original image.

With continued reference to the illustrative example, replacing module 129 replaces the color green, from the original image, with the color blue since the color blue is determined to be more distinguishable than the color green at the vicinity of the border between the car and the red firetruck in the original image. Furthermore, since the car is the object with the lowest confidence score in the original image, replacing module 129 replaces the color of this object with a more distinguishable color and therefore, the image as a whole, can more easily be perceived by a person having a color vision deficiency.

In recent years, considerations of the color universal design (CUD) have become more active as a social movement. In alternative exemplary embodiments, the disclosed AI model herein may be applied to checking whether a web page or poster is compatible with the CUD or exemplifying what change allows the web page or poster to be compatible with the CUD.

In further exemplary embodiments, particularly in the case where furniture, clothes, or the like are designed in the creation of a virtual reality (VR) space or CD image, it is possible to achieve a color arrangement that facilitates the distinction from peripheral objects within an image.

In alternative embodiments, color replacement AI program 120 may also be applied to videos. In the case where object "A" and object "B" overlap with each other in a frame and object "B" and object "C" overlap with each other in another frame, a color to give a less strangeness feeling due to color change is selected from the colors of the objects "A", "B", and "C". The tracking of physical objects across frames is performed using object detection or other similar known techniques.

In further alternative embodiments, color replacement AI program 120 can be used for the purpose of automatically altering the screen of augmented reality (AR) goggles, or a smartphone used by the person having color blindness, to a screen that is easily recognized by the person having color blindness.

In the case of AR or virtual reality (VR), the additional learning by the automatic image colorization AI model may be performed using recorded video data about a user's view. Thereby, it would be possible to perform a color replacement that gives a less strangeness feeling to the user. For example, it is possible to avoid the replacement of the color of an object that the user is used to seeing, as exemplified by the color of the clothes owned by the user and the color of the external wall of the user's house.

The present disclosure teaches that it is possible to perform a color replacement that gives a less strangeness feeling to a viewer, when the color replacement is performed for an object that is hard to be distinguished from a peripheral physical object due to similar colors in order to facilitate the distinction between the physical objects.

In exemplary embodiments, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth® network, a WiFi network, a peer-to-peer (P2P) communication network, a mesh network, or a combination thereof. In general, network 102 can be any combination of connections and protocols that will support communications between host server 110, computing device 130, and server 140.

Figure 3:
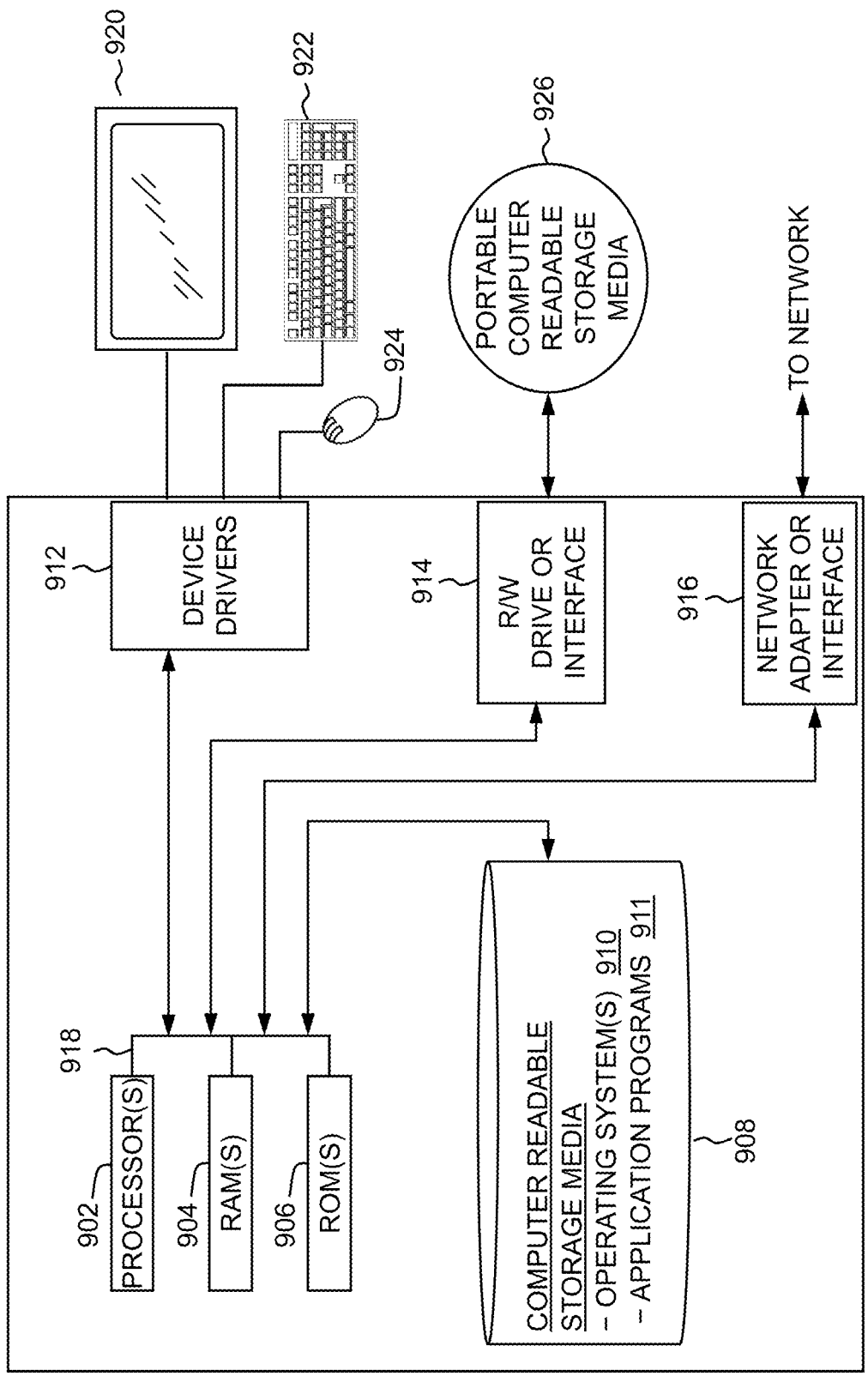
FIG. 3 is a block diagram depicting the hardware components of the color replacement environment of FIG. 1, in accordance with an embodiment of the present invention.

FIG. 3 is a block diagram depicting components of a computing device (such as host server 110, as shown in FIG. 1), in accordance with an embodiment of the present invention. It should be appreciated that FIG. 3 provides only an illustration of one implementation and does not imply any limitations regarding the environments in which different embodiments may be implemented. Many modifications to the depicted environment may be made.

Computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications, and network processors, etc.), system memory, peripheral devices, and any other hardware components within a system.

One or more operating systems 910, and one or more application programs 911, such as color replacement AI program 120, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 3 may also include a R/W drive or interface 914 to read from and write to one or more portable computer readable storage media 926. Application programs 911 on computing device of FIG. 3 may be stored on one or more of the portable computer readable storage media 926, read via the respective RAY drive or interface 914 and loaded into the respective computer readable storage media 908.

Computing device of FIG. 3 may also include a network adapter or interface 916, such as a TCP/IP adapter card or wireless communication adapter (such as a 4G wireless communication adapter using OFDMA technology). Application programs 911 on computing device of FIG. 3 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
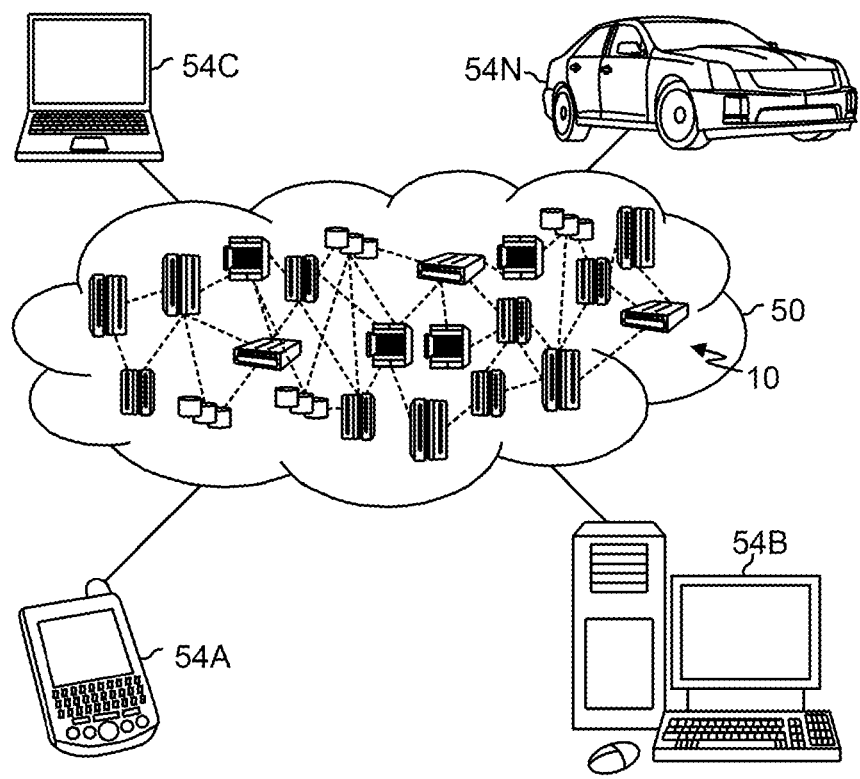
FIG. 4 is a diagram depicting a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
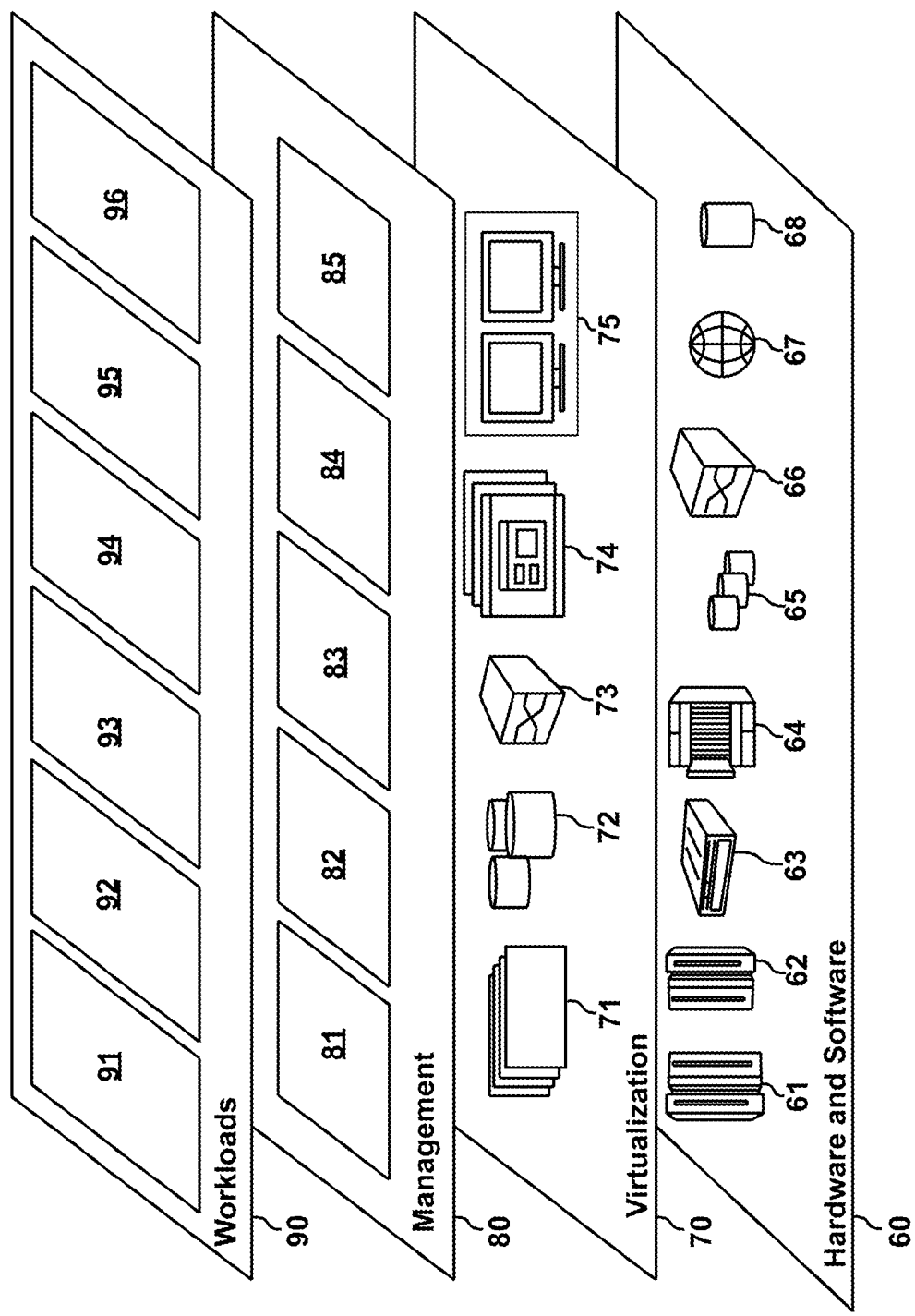
FIG. 5 is a diagram depicting abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for selectively replacing a color of an object in an original image, the method comprising:
   identifying one or more color groups that are hard to be distinguished by a person having a color vision deficiency at a border between one or more objects in an original image;
   generating a grayscale image from the original image, in response to the identification of the one or more color groups that are hard to be distinguished;
   estimating an original color of each pixel in the original image by inputting the generated grayscale image to an automatic colorization artificial intelligence (AI) model, wherein the automatic colorization AI model estimates the original color of the one or more objects in the gray scale image;

determining at least one color group for which color replacement is to be performed, from the one or more color groups that are hard to be distinguished, wherein the at least one color group for which the color replacement is to be performed is a color group for which a confidence level of the estimated original color by the automatic colorization AI model is low; and replacing the determined at least one color group with a color that is easily perceived by the person having a color vision deficiency and that is easily distinguished from the one or more color groups at the border between the one or more objects in the original image.

2. The computer-implemented method of claim 1, further comprising:

mapping a plurality of original colors of the original image with the one or more colors that are seen by the person having the color vision deficiency;

identifying the one or more objects in the original image for which color replacement is needed, based on the mapping; and grouping similar colors of the plurality of original colors in the identified one or more objects in the original image.

3. The computer-implemented method of claim 2, wherein grouping similar colors of the plurality of original colors in the identified one or more objects in the original image further comprises:

grouping the colors into ranges that include a certain number of colors, wherein the ranges include several tens of colors to several hundreds of colors.

4. The computer-implemented method of claim 1, further comprising:

replacing the determined at least one color group with a color that does not affect a perception of the one or more objects in the image.

5. The computer-implemented method of claim 1, further comprising:

estimating a degree of strangeness feeling perceived by a viewer, based on the replaced at least one color group of the identified one or more objects in the original image; and wherein the one or more objects that gives a strong strange feeling to the viewer, due to the replaced at least one color group, has a high confidence level in colorization by the automatic colorization AI model and is colorized with the same color as that in the original image.

6. The computer-implemented method of claim 1, wherein the automatic image colorization AI model is a technology of learning one or more combinations of shapes and colors from a large amount of image data and colorizing a monochrome image.

7. The computer-implemented method of claim 1, further comprising:

calculating a score for each of the adjacent objects that are hard to be distinguished; and for each of the color groups, using a color with the lowest calculated score to replace the color group in the original image.

8. A computer program product for providing a framework to identify questions and answers dynamically from a dataset based on previous learning and an evaluation score of a user, comprising a non-transitory tangible storage device having program code embodied therewith, the program code executable by a processor of a computer to perform a method, the method comprising:

identifying one or more color groups that are hard to be distinguished by a person having a color vision deficiency at a border between one or more objects in an original image;

generating a grayscale image from the original image, in response to the identification of the one or more color groups that are hard to be distinguished;

estimating an original color of each pixel in the original image by inputting the generated grayscale image to an automatic colorization artificial intelligence (AI) model, wherein the automatic colorization AI model estimates the original color of the one or more objects in the gray scale image;

determining at least one color group for which color replacement is to be performed, from the one or more color groups that are hard to be distinguished, wherein the at least one color group for which the color replacement is to be performed is a color group for which a confidence level of the estimated original color by the automatic colorization AI model is low; and replacing the determined at least one color group with a color that is easily perceived by the person having a color vision deficiency and that is easily distinguished from the one or more color groups at the border between the one or more objects in the original image.

9. The computer program product of claim 8, further comprising:

mapping a plurality of original colors of the original image with the one or more colors that are seen by the person having the color vision deficiency;

identifying the one or more objects in the original image for which color replacement is needed, based on the mapping; and grouping similar colors of the plurality of original colors in the identified one or more objects in the original image.

10. The computer program product of claim 9, wherein grouping similar colors of the plurality of original colors in the identified one or more objects in the original image further comprises:

grouping the colors into ranges that include a certain number of colors, wherein the ranges include several tens of colors to several hundreds of colors.

11. The computer program product of claim 8, further comprising:

replacing the determined at least one color group with a color that does not affect a perception of the one or more objects in the image.

12. The computer program product of claim 8, further comprising:

estimating a degree of strangeness feeling perceived by a viewer, based on the replaced at least one color group of the identified one or more objects in the original image; and wherein the one or more objects that gives a strong strange feeling to the viewer, due to the replaced at least one color group, has a high confidence level in colorization by the automatic colorization AI model and is colorized with the same color as that in the original image.

13. The computer program product of claim 8, wherein the automatic image colorization AI model is a technology of learning combinations of shapes and colors from a large amount of image data and colorizing a monochrome image.

14. The computer program product of claim 8, further comprising:
   calculating a score for each of the adjacent objects that are hard to be distinguished; and
   for each of the color groups, using a color with the lowest calculated score to replace the color group in the original image.

15. A computer system, comprising:
   one or more computer devices each having one or more processors and one or more tangible storage devices; and
   a program embodied on at least one of the one or more storage devices, the program having a plurality of program instructions for execution by the one or more processors, the program instructions comprising instructions for:
      identifying one or more color groups that are hard to be distinguished by a person having a color vision deficiency at a border between one or more objects in an original image;
      generating a grayscale image from the original image, in response to the identification of the one or more color groups that are hard to be distinguished;
      estimating an original color of each pixel in the original image by inputting the generated grayscale image to an automatic colorization artificial intelligence (AI) model, wherein the automatic colorization AI model estimates the original color of the one or more objects in the gray scale image;
      determining at least one color group for which color replacement is to be performed, from the one or more color groups that are hard to be distinguished, wherein the at least one color group for which the color replacement is to be performed is a color group for which a confidence level of the estimated original color by the automatic colorization AI model is low; and
      replacing the determined at least one color group with a color that is easily perceived by the person having a color vision deficiency and that is easily distinguished from the one or more color groups at the border between the one or more objects in the original image.

16. The computer system of claim 15, further comprising:
   mapping a plurality of original colors of the original image with the one or more colors that are seen by the person having the color vision deficiency;
   identifying the one or more objects in the original image for which color replacement is needed, based on the mapping; and
   grouping similar colors of the plurality of original colors in the identified one or more objects in the original image.

17. The computer system of claim 16, wherein grouping similar colors of the plurality of original colors in the identified one or more objects in the original image further comprises:
   grouping the colors into ranges that include a certain number of colors, wherein the ranges include several tens of colors to several hundreds of colors.

18. The computer system of claim 15, further comprising:
   replacing the determined at least one color group with a color that does not affect a perception of the one or more objects in the image.

19. The computer system of claim 15, further comprising:
   estimating a degree of strangeness feeling perceived by a viewer, based on the replaced at least one color group of the identified one or more objects in the original image; and
   wherein the one or more objects that gives a strong strange feeling to the viewer, due to the replaced at least one color group, has a high confidence level in colorization by the automatic colorization AI model and is colorized with the same color as that in the original image.

20. The computer program product of claim 15, further comprising:
   calculating a score for each of the adjacent objects that are hard to be distinguished; and
   for each of the color groups, using a color with the lowest calculated score to replace the color group in the original image.

* * * * *